May 3, 1938. W. A. HEINZE 2,116,240
GREASE RETAINER WITH CLAMPED PACKING
Filed Aug. 30, 1933 2 Sheets-Sheet 1
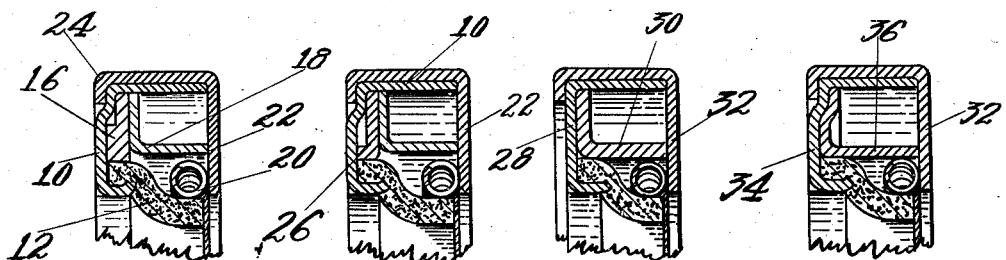
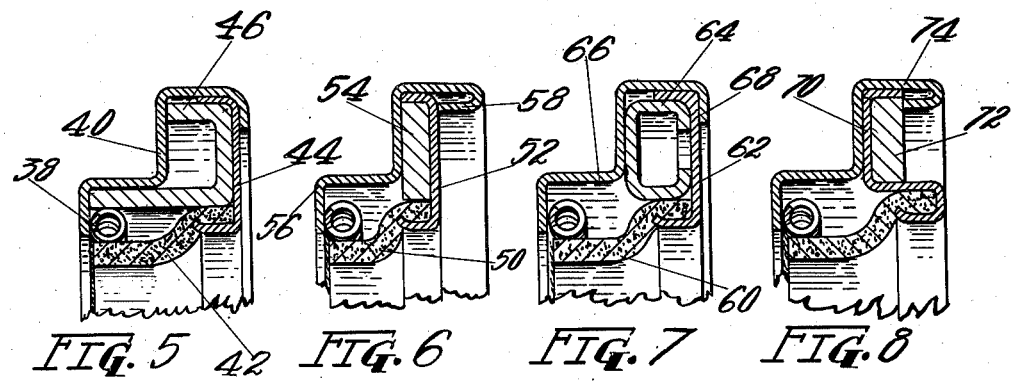
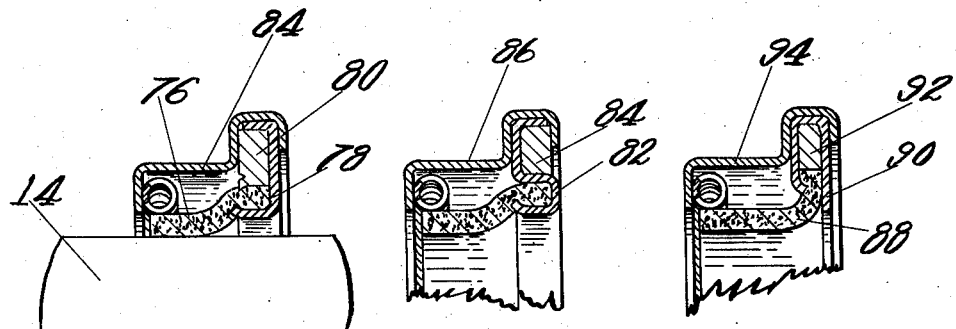
WILLIAM A. HEINZE
INVENTOR
PER
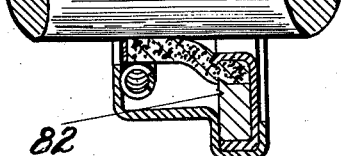
ATTORNEY May 3, 1938. W. A. HEINZE 2,116,240
GREASE RETAINER WITH CLAMPED PACKING
Filed Aug. 30, 1933 2 Sheets-Sheet 2

WILLIAM A. HEINZE
INVENTOR

PER Albert J. Fihe
ATTORNEY

Patented May 3, 1938

2,116,240

UNITED STATES PATENT OFFICE 2,116,240

GREASE RETAINER WITH CLAMPED PACKING

William A. Heinze, Chicago, Ill., assignor to Victor Manufacturing & Gasket Company, Chicago, Ill., a corporation of Illinois Application August 30, 1933, Serial No. 687,475

6 Claims. (Cl. 288—1)

This invention relates to an improved grease retainer with clamped packing, and has for one of its principal objects the provision of a grease retainer or oil seal adapted to be used with rotatable shafts wherein the packing material is clamped in position in the retainer so as to afford a highly satisfactory sealing means.

One of the important objects of this invention is to provide a grease retainer or oil seal for rotating shafts or the like which shall be constructed as a single unit and so designed that the unit may be driven into position with regard to a shaft without any danger of damaging or mis-shaping the unit by such driving blows.

Another important object of the invention is to provide a grease retainer having a casing of a certain distinctive exterior shape for use in connection with distinct types of equipment such as a certain make of an automobile or the like.

A still further important object of the invention resides in the provision of a grease retainer which includes a substantially cylindrical ring of packing material mounted in a casing which itself comprises an integral unit, the whole being preliminarily assembled into a device which can be readily used for replacements, repairs and the like, and which can practically be considered as a standard part.

Other and further important objects of the invention will be apparent from the disclosures in the accompanying drawings and following specification.

The invention, in a preferred form, is illustrated in the drawings and hereinafter more fully described.

In the drawings:

Figure 1 is a sectional view of one side of an improved grease retainer constructed in accordance with the novel principles of this invention.

Figure 2 is a view similar to Figure 1, showing a slight modification.

Figure 3 is also a similar view, illustrating a further modification.

Figure 4 shows a modification of the type illustrated in Figure 3.

Figure 5 is a sectional view of a slightly different form of grease retainer.

Figure 6 is a further modification of the form shown in Figure 5.

Figure 7 is another modification.

Figure 8 shows a still further modified form.

Figure 9 is a sectional view of a slightly different type of grease retainer, this being shown in complete section and in assembled position on the shaft.

Figure 10 is a slight modification of the embodiment shown in Figure 9.

Figure 11 constitutes a still further modification.

Figure 12:
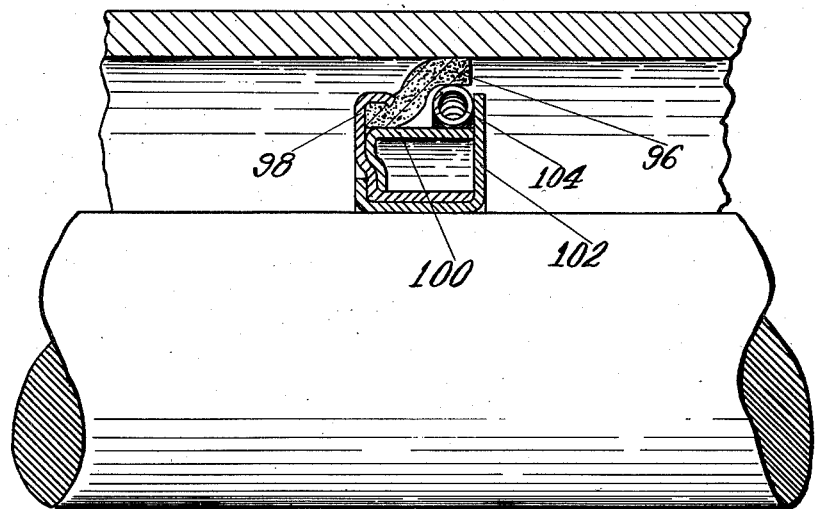

Figure 12 is a sectional view, parts being broken away, showing another modification of the invention whereby the resilient packing element is positioned on the outer periphery of the grease retainer, the retainer in this case rotating with the shaft.

Figure 13:
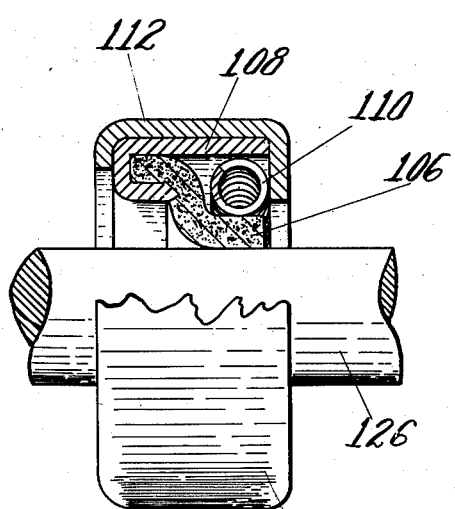

Figure 13 illustrates a still further modification, embodying a simplified form of structure.

Figure 14:
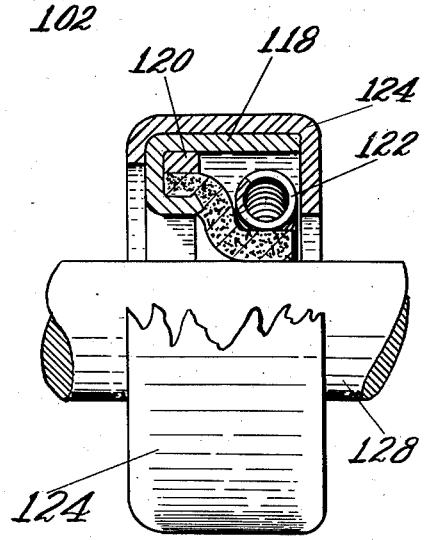

Figure 14 is another embodiment similar to that of Figure 13, with the inclusion, however, of a combined strengthening washer and clamping means.

As shown in the drawings:

In the various figures, there are shown certain types of grease retainers which embody essentially a resilient packing element preferably composed of leather and which is somewhat cylindrical in shape with one portion of slightly larger diameter than the other.

In the embodiments of the invention shown in all the figures with the exception of Figure 12, the restricted portion of the packing element contacts a rotating shaft and is maintained in close relationship therewith by means of a garter spring. This assembly of resilient packing and the garter spring is retained in relationship to each other and to the shaft by means of a metallic housing which is composed of two or more parts whereby a unitary structure results which can be readily placed in position around the shaft and which is particularly adapted for assembly work, especially where repairs or replacements are necessary. These grease retainers can also be made standard for various types of cars so that the same may be readily identified and quickly placed in desired assembled relationship.

In the embodiment of the invention shown in Figure 12, the resilient packing is mounted on the outer periphery of the grease retainer, this being used when the retainer rotates with the shaft as is necessary or desirable in some cases.

Each individual embodiment or exemplification of the invention will now be described in more detail.

The reference numeral 10 (Figures 1 and 2) indicates generally a sheet metal gripping element which is somewhat cup-shaped as shown, having an annular opening in the center thereof and which is adapted to securely grip a packing element 12 which is preferably composed of leather and which is somewhat cylindrical in shape, as illustrated, being tapered inwardly for contacting relationship with a corresponding rotatable shaft such as the shaft shown at 14 in Figure 9.

That end of the packing 12 which has the largest diameter is securely gripped between an in-turned flange of the cup-shaped element 10 and a washer or the like 16 which is placed in the bottom of the cup-shaped element 10 in an obvious manner as illustrated.

It will be noted that the washer 16 is somewhat L-shaped in cross-section, one edge being recessed to allow for a corresponding annular indentation in the edge of the cup-shaped element 10, this being for the purpose of providing a more neat appearing finished device.

The gripping contact of the larger edge of the leather packing 12 is accomplished by an inward turning by spinning or the like of the upwardly turned inner edge of the cup-shaped element 10 after the washer 16 is in position in the cup, whereupon a tight gripping relationship of that edge of the leather packing results.

A thrust resisting member 18 L-shaped in cross-section as best shown in Figure 1 is then positioned in the cup-shaped element 10 with its flat annular flange adjacent to and contacting the corresponding inner surface of the washer 16, and a garter spring 20 is then placed in position around that portion of the packing element 12 which is of lesser diameter as shown, and a housing 22 also cup-shaped is then assembled around the whole in a manner as illustrated in the figure, the upper edge of this housing 24 being spun down and inwardly as illustrated to provide a unitary device which, as a single unit, can be placed in position in a car or other mechanism either as original equipment or as a replacement item.

While none of the sheet metal elements 10, 18 or 22 will, in actual practice, be found thick enough to withstand blows from a hammer or the like to which these grease retainers are subjected in installation, it has been found that the assembly of these parts, particularly in conjunction with the washer 16, will provide a strong and substantial grease retainer which can be driven into position without fear of damage or distortion.

In the construction shown in Figure 2, the device is quite similar to that of Figure 1 except that a washer 26 is substituted for the washer 16 of the equipment of Figure 1. This washer 26 is not quite as heavy as the washer 16, comprising essentially an annular flat element having its inner edge turned downwardly at a right angle to form a protecting and reinforcing flange which also acts as a base for the action or thrust of the inwardly turned gripping flange of the cup-shaped member 10.

In Figure 3, a cup-shaped member 28 is provided which grips the edge of the leather packing, this gripping being in conjunction with the heel of a co-acting gripping element 30 which is also L-shaped in cross-section and fitted into the cup-shaped element 28.

A housing 32 is then spun into assembled relationship with the other parts in an obvious manner, thereby also providing a complete and satisfactory grease retainer.

In Figure 4 is illustrated a slight modification of the sealing element shown in Figure 3 wherein provision is made for a countersunk or offset edge, this being done by a slight distortion of the original cup-shaped element 34 and its corresponding L-shaped gripping member 36 as best shown in this figure.

In Figures 5 to 8 are illustrated similar grease retainers which, however, have casings of a peculiar exterior shape, these being provided for cooperation with certain peculiar types of mechanisms, particularly motor car axles.

For example in Figure 5, the exterior housing 38 is shown as provided with an offset seat 40, the leather packing 42 being gripped in position between an exterior cup-shaped element 44 and an interior heavier element 46 which is somewhat U-shaped in cross-section as best shown in the figure.

One arm of this U-shaped element 46 is longer than the other and extends into the restricted portion of the cup-shaped element 38—40 to provide for a better reinforcing and thrust-resisting action.

In the modification shown in Figure 6, the packing 50 is made shorter, one edge, however, being gripped between a cup-shaped gripping element 52 and the inner face of an annular washer 54, this assembly being in turn inserted into a cup-shaped housing 56, the periphery of the larger end of this housing being bent downwardly and inwardly as shown at 58 into a gripping contact with the outer face of the cup-shaped gripping element 52 whereby another unitary structure results which is proof against hard usage and the like.

In the modified form of Figure 7, the leather packing 60 is held in gripped relationship by the in-turned edge of a cup-shaped element 62, this acting in conjunction with the inner face of a washer 64 which is somewhat tubular in cross-section as shown in the drawings and which, on account of its being constructed of heavier material and its tubular shape, is also considerably resistant to thrusting and hammering action, especially when reinforced with the outer face of the gripping element 62 and inserted in the housing 66, the edge of the outer periphery of this housing being likewise spun down as shown at 68 to form a unitary compact structure.

In Figure 8, the gripping element for the packing comprises a substantially S-shaped element 70, one lip of the S being smaller than the other and acting merely as a gripping element for the larger periphery of the packing, while the other lip of the S serves to receive and enclose an annular washer 72 of relatively heavy material which, on account of its thickness, also acts as a backing for a portion of the gripping element 70, particularly at the point where the gripping of the leather packing takes place. This gripping element and washer assembly is then inserted into a corresponding housing 74 which is then shaped by an inward and downward bending of its outermost flange into a unitary device.

In Figure 9 is illustrated a complete section of another form of grease retainer, this figure showing the same as applied to a rotatable shaft, the metal packing element 76 being retained in sealing relationship against the face of the shaft by means of the usual garter spring as shown.

A cup-shaped gripping element for one edge of the leather packing is provided as at 78, this being in this instance shaped so as to inclose a heavy annular washer or the like 80 which, in order to insure a more adequate gripping relationship between itself and the cup-shaped element 78, is notched at intervals as shown at 82, whereby a slight displacement of the metal takes place and a better gripping action on the leather results. This assembly is then placed in the corresponding housing 84, the upper edge of which is then spun down to complete the unit.

In Figure 10 is illustrated a device somewhat similar to that of Figure 8 wherein the leather gripping device 82 is S-shaped in cross-section and the same incloses an annular washer 84 similar to the corresponding elements 70 and 72 respectively of Figure 8. This assembly is then inclosed in a suitably shaped housing 86 which is then spun down around the same in the usual manner.

All of these devices provide a metal to metal contact at points where any thrusts or blows are encountered at such times when the retainers are being driven into position. These metal reinforcements provide a light but strong structure while at the same time eliminating the possibility of damage to the soft leather packing which, in previous constructions, is often damaged during positioning.

In Figure 11 is shown a further modification wherein the leather packing 88 has one edge turned outwardly instead of being merely offset as in the other device, and this is then gripped and held in position by means of the combination of a gripping element 90 which is somewhat U-shaped in cross-section, and an inclosed relatively heavy annular washer 92. The washer, besides acting as a stop for the abutting edge of the leather packing 88 also provides a thrust and blow resisting element which is essential in all of these grease retainer constructions. This assembly of the packing, washer and gripping element is then inclosed in a housing 94 which is formed into position there-around in an obvious manner.

In some cases, the grease retainer is fitted to the shaft and revolves therewith, and in this event, the leather packing is applied to the external periphery of the retainer as shown in Figure 12. Here the leather packing element 96 is gripped at its end of lesser diameter by a clamping housing which embodies a cup-shaped annular metal element 98 having its longer side interiorly thereof and with its outer peripheral flange bent upwardly and then slightly inwardly into clamping relationship with the leather packing, this clamping action being against the outer face of an interfitting element 100 which is L-shaped in cross-section and adapted to be positioned in the cup-shaped element 98 as shown in Figure 12. These elements 98 and 100 are then incased in an outer housing structure 102 which retains the spring 104 in position and also provides a unitary structure which, in addition to being proof against accidental displacement of any of the parts, also provides a strong reinforced housing which can be readily placed in position by the ordinary tools without fear of damage or accidental battering out of shape. In this event, the spring 104 acts as an expansion spring instead of a contraction spring.

In the modification shown in Figure 13, the leather packing 106 is gripped at its edge of greater diameter by the shorter leg of a U-shaped gripping element 108, the longer leg of which incloses the usual garter spring 110, and this assembly is then placed in an exterior housing 112 which acts as a protective structure which is reinforced by the U-shaped element 108. It will be noted that the inward bending of the shorter leg of the U-shaped element 108 forms a one-piece clamping structure.

The modification illustrated in Figure 14 is quite similar to that of Figure 13 with the exception that the U-shaped clamping element 118 has a wider base into which is inserted an annular washer 120 against which the outer face of the leather packing abuts when clamped. This assembly together with the garter spring 122 is then placed in an outer casing 124 which provides additional strength and also a unitary article. As will be noted from these last two described figures, the same are adapted to be used with rotating shafts 126 and 128 respectively.

It will be seen that herein is provided a grease retainer of a type considerably different from those heretofore employed and on the market in that the leather packing element instead of being shaped to a somewhat angular cross-section is merely offset or stretched at one end so as to result in a packing which is at all times substantially cylindrical, and accordingly, more efficient.

This offset also, of course, provides for a suitable gripping action against that particular end of the packing whereby the same is suitably retained in desired position in its housing. This gripping action is then brought into play in conjunction with a thrust and blow resisting washer which elements, when combined into a housing of suitable exterior shape, result in a grease retainer which is quite satisfactory, can be readily installed or replaced, and which, furthermore, is economical of construction and efficient in operation.

I am aware that many changes may be made in the ingredients and numerous details in the process varied throughout a wide range without departing from the principles of this invention, and I, therefore, do not purpose limiting the patent granted hereon otherwise than as necessitated by the prior art.

I claim as my invention:

1. A grease retainer, including a substantially cylindrical packing having a flare at one end, and means for retaining the packing in the retainer and against a rotatable shaft, said means including a pair of co-acting gripping elements associated with the flared end of the packing, one of said elements comprising a cup-shaped holder and the other of said elements comprising a washer, together with a containing housing for said assembly, and an offset seat integrally formed in the housing, one edge of the housing being turned inwardly and thence downwardly against corresponding portions of the gripping element and washer assembly to provide a unitary structure.

2. A grease retainer, including a substantially cylindrical packing having a flare at one end, and means for retaining the packing in the retainer and against a rotatable shaft, said means including a pair of co-acting gripping elements associated with the flared end of the packing, one of said elements comprising a cup-shaped holder and the other of said elements comprising a washer, one edge of one of the gripping elements being spun inwardly to partially penetrate the leather packing and provide a gripping relationship between said edge and corresponding portions of the washer.

3. A grease retainer for rotating shafts including a flexible packing element in substantially the shape of a hollow truncated cone, a combined housing and retaining means for the packing element, said means comprising a cup-shaped annular shell, an in-turned flange formed around the annular opening in the shell, and means adapted to clinch the packing against said flange, said means including a washer seated in the cup, and additional reinforcing means in the shell, together with a housing surrounding the shell, packing and reinforcing means.

4. A grease retainer for rotating shafts including a flexible packing element in substantially the shape of a hollow truncated cone, a combined housing and retaining means for the packing element, said means comprising a cup-shaped annular shell, an in-turned flange formed around the annular opening in the shell, and means adapted to clinch the packing against said flange, said means including a washer seated in the cup, and additional reinforcing means in the shell, together with a housing surrounding the shell, packing and reinforcing means, said reinforcing means abutting the housing for further reinforcement thereof.

5. A grease retainer, including a flexible packing element, and means for supporting the packing element, said means including a cup-shaped annular shell, an in-turned flange on the shell for gripping the packing, and means positioned in the shell for supporting the packing in gripped position, said means additionally comprising a reinforcement for the shell, and a housing positioned about the shell and reinforcement.

6. A grease retainer, comprising a resilient packing element, means for clamping one edge of the packing element, said means comprising an annular cup U-shaped in cross-section, the packing being clamped between the legs of the U, together with a garter spring surrounding the packing, and a housing inclosing the spring, packing and clamping element, and an annular washer in the legs of the U-shaped element for providing a better clamping of the packing and also for reinforcing the entire structure.

WILLIAM A. HEINZE.